United States Patent [19]

Lapps et al.

[11] Patent Number: 5,178,099
[45] Date of Patent: Jan. 12, 1993

[54] FILTERING PET PRIVY

[76] Inventors: Rudolph Lapps, 22444 Remick, Mt. Clemens, Mich. 48043; Jeffrey R. Mohr, 38634 E. Golfview, Mt. Clemens, Mich. 48044

[21] Appl. No.: 884,071

[22] Filed: May 15, 1992

[51] Int. Cl.$^5$ .............................................. A01K 1/01
[52] U.S. Cl. .................................... 119/166; 119/161
[58] Field of Search ............... 119/164, 165, 166, 167, 119/168; 209/235, 161, 165

[56] References Cited

U.S. PATENT DOCUMENTS

| | | | |
|---|---|---|---|
| 3,482,546 | 12/1969 | Anderson | 119/166 |
| 3,908,597 | 9/1975 | Taylor | |
| 4,117,804 | 10/1978 | Moore et al. | |
| 4,120,264 | 10/1978 | Carter | |
| 4,327,667 | 5/1982 | Bicak | |
| 4,846,104 | 7/1989 | Pierson, Jr. | |
| 4,886,014 | 12/1989 | Sheriff | |
| 5,048,465 | 9/1991 | Carlisi | 119/166 |

Primary Examiner—Gene Mancene
Assistant Examiner—Thomas Price
Attorney, Agent, or Firm—Peter D. Keefe

[57] ABSTRACT

A pet privy which separates coagulated granular absorbent litter material and feces from uncoagulated granular absorbent litter material, composed generally of a litter box component pivotally connected with respect to a support frame. The litter box component, in turn, is composed generally of a tray for holding granular absorbent litter material, a hood member connected with the tray having a pet access port at a frontwall thereof and a discharge chute at a rearwall thereof, a retention chamber adjacent the rearwall of the hood member, a filter grid overlying the retention chamber, a discharge funnel overlying the retention chamber and adjacent the filter grid, and a disposal bag removably connected with the discharge chute. In operation, when the granular absorbent litter material requires servicing, the user simply pivots the litter box component on the support frame, thereby causing the granular absorbent litter material to slide toward the rearwall. Only uncoagulated granular absorbent litter material passes through the filter grid into retention chamber, while coagulated granular absorbent litter material and feces slide along elongate members of the filter grid into the discharge funnel, out the discharge chute and finally into the disposal bag. Reversal of the pivot movement just described causes the uncoagulated granular absorbent litter material within the retention chamber to pass again through the filter grid and into the tray, whereupon the pet litter facility is again ready for service as a pet privy.

29 Claims, 4 Drawing Sheets

FILTERING PET PRIVY

BACKGROUND OF THE INVENTION

1. Field of the Invention

The present invention relates to pet privies for one or more pets to relieve themselves indoors utilizing granular absorbent litter material, and more particularly to litter box type pet privies capable of filtering coagulated from uncoagulated granular absorbent litter material. Still more particularly, the present invention relates to a pet privy which provides for easy filtering of coagulated from uncoagulated granular absorbent litter material, wherein coagulated granular absorbent litter material is deposited directly into a disposal bag.

2. Description of the Prior Art

Pet privies, particularly those used for cats, typically utilize a box-like structure which retains a reservoir of granular absorbent litter material. When the pet relieves itself, the granular absorbent litter material coagulates as urine and other liquid wastes are deposited thereinto. This type of device has received universal acceptance from pet owners in that odors are minimized and pet excrement is conveniently contained for future disposal.

Disposal has, however, been the perennial problem. Since most of the granular absorbent litter material is not coagulated or otherwise spoiled, it is environmentally and economically unwise to simply throw out the entire litter material contents of the pet privy in order to dispose of an accumulation of pet waste. Yet, manually filtering out the coagulated granular absorbent litter material and feces from the uncoagulated granular absorbent litter material is both laborious and unsanitary. Accordingly, the prior art has addressed the issue of selective disposal of granular absorbent litter material, with some success, as follows.

U.S. Pat. No. 3,908,597 to Taylor, dated Sept. 30, 1975, discloses a two compartment litter based pet privy in which an upper tray is separated from a lower tray be a removable partition. When it is time to service the granular absorbent litter material located in the upper tray, the partition is removed, allowing only uncoagulated granular absorbent litter material to pass through a screen at the bottom of the upper tray. Thus, only coagulated granular absorbent litter material and feces remain the upper tray for disposal, while the lower tray holds uncoagulated granular absorbent litter material.

U.S. Pat. No. 4,117,804 to Moore et al, dated Oct. 3, 1978, discloses a litter based pet privy that both disposes of coagulated granular absorbent litter material and deodorizes the device. A screen partition separates two ends of a box. When it is time to clean the device, the box is tilted so that all the uncoagulated granular absorbent litter material passes through the screen, leaving behind coagulated granular absorbent litter material and feces. A movable partition is then removed, allowing the waste to fall into a deodorized bottom area for later disposal.

U.S. Pat. No. 4,120,264 to Carter, dated Oct. 17, 1978, discloses a litter based pet privy which is structured to be rotated in order to selectively direct the litter contents thereof through a filter which separates the litter contents so that coagulated granular absorbent litter material and feces may be thereupon directed by gravity and the incline of the filter into a disposal bag.

U.S. Pat. No. 4,327,667 to Bilak, dated May 4, 1982, discloses a litter based pet privy which incorporates a receptacle having a trap door and holding granular absorbent litter material. To service the granular absorbent litter material, the trap door is released, and an angled screen filters uncoagulated granular absorbent litter material into a tray, while directing coagulated granular absorbent litter material and feces into a disposal bag.

U.S. Pat. No. 4,846,104 to Pierson, Jr., dated Jul. 11, 1989, discloses a litter based pet privy which is structured for rotational movement for purposes of filtering and aerating granular absorbent litter material. During a cycle of operation of the pet privy, the granular absorbent litter material is caused to tumble so as to aerate and further to be filtered through a flat screen for reuse, with coagulated granular absorbent litter material and feces which are unable to pass through the screen being directed to a disposal bag.

Finally, U.S. Pat. No. 4,886,014 to Sheriff, dated Dec. 12, 1989, discloses a litter based pet privy having a pair of chutes and a wire mesh separator. The user lifts the device and tilts it to the left so as to cause the granular absorbent litter material to deposit into a first chute in the left sidewall. Now, the device is tilted backward, causing the granular absorbent litter material to enter a second chute in the rearwall. Next the user levels the device, with gravity now causing the granular absorbent litter material to fall upon a wire mesh which allows to pass therethrough only uncoagulated granular absorbent litter material. The retained coagulated granular absorbent litter material and feces are thereupon caused to exit the device into a disposal bag by the user tilting the device to the right. Again leveling the device readies it for the next usage by the user's pet.

While all the aforesaid pet privies provide a sortation structure which separates coagulated granular absorbent litter material and feces from uncoagulated granular absorbent litter material, these pet privies suffer from a variety of drawbacks. These drawbacks include undue structural and operational complexities rendering them impractical for most pet owners, who would, more likely than not, rather just use a plain box filled with granular absorbent litter material and manually sift it, rather than purchase an expensive and impractical pet privy of the class aforesaid.

Accordingly, what remains needed in the art is a pet privy using a conventional litter material which separates coagulated granular absorbent litter material and feces from uncoagulated granular absorbent litter material in a manner which is easy to use, practical, simple, and inexpensive.

SUMMARY OF THE INVENTION

The present invention is a pet privy which separates coagulated granular absorbent litter material and feces from uncoagulated granular absorbent litter material having a structure and function which is easy to use, practical, simple, and inexpensive.

The pet privy according to the primary version of the present invention is composed generally of a litter box component pivotally connected with respect to a support frame. The litter box component is composed generally of a tray for holding granular absorbent litter material, a hood member connected with the tray having a pet access port at a frontwall thereof and a discharge chute at a rearwall thereof, a retention chamber adjacent the rearwall of the hood member, a filter grid overlying the retention chamber, a discharge funnel overlying the retention chamber and adjacent the filter grid, and a disposal bag removably connected with the discharge chute.

In operation, when the granular absorbent litter material requires servicing, the user simply pivots the litter box component on the support frame, thereby causing the granular absorbent litter material to slide toward the rear end of the tray. Only uncoagulated granular absorbent litter material passes through the filter grid into the retention grid, while coagulated granular absorbent litter material and feces slide along elongate members of the filter grid to the discharge chute and then into the disposal bag. Reversal of the pivot movement just described causes the uncoagulated granular absorbent litter material within the retention chamber to pass again through the filter grid and into the tray, whereupon the pet privy is again ready for service as a pet privy.

In a secondary version of the pet privy according to the present invention, the hood is optionally reduced to being merely a rearwall component, there is no support frame and the disposal bag is obviated. In operation, the user would pick up the pet privy and then tilt it so that coagulated granular absorbent litter material and feces exits therefrom into a garbage can or the like.

Accordingly, it is an object of the present invention to provide a pet privy which is structured so that contained granular absorbent litter material is serviced by a simple, guided pivot movement of a litter box component which thereby results in only the coagulated granular absorbent litter material and feces being deposited into a disposal bag.

It is an additional object of the present invention to provide a pet privy which simply and easily sorts coagulated granular absorbent litter material from uncoagulated granular absorbent litter material.

It is another object of the present invention to provide a pet privy which is structurally and operationally practical for any pet owner to have and operate.

It is yet another object of the present invention to provide an effective filtration mechanism to separate coagulated granular absorbent litter material and feces from uncoagulated granular absorbent litter material, wherein the structure thereof further facilitates directed movement of the coagulated granular absorbent litter material and feces to a disposal location.

These, and additional objects, advantages, features and benefits of the present invention will become apparent from the following specification.

BRIEF DESCRIPTION OF THE DRAWINGS

FIG. 6 is a partly cut-away side view of the primary version of the pet privy according to the present invention shown in the fully pivoted orientation, and depicting an operational situation in which granular absorbent litter material is in the process of being filtered and waste disposed of.

DETAILED DESCRIPTION OF THE PREFERRED EMBODIMENT

Figure 1:
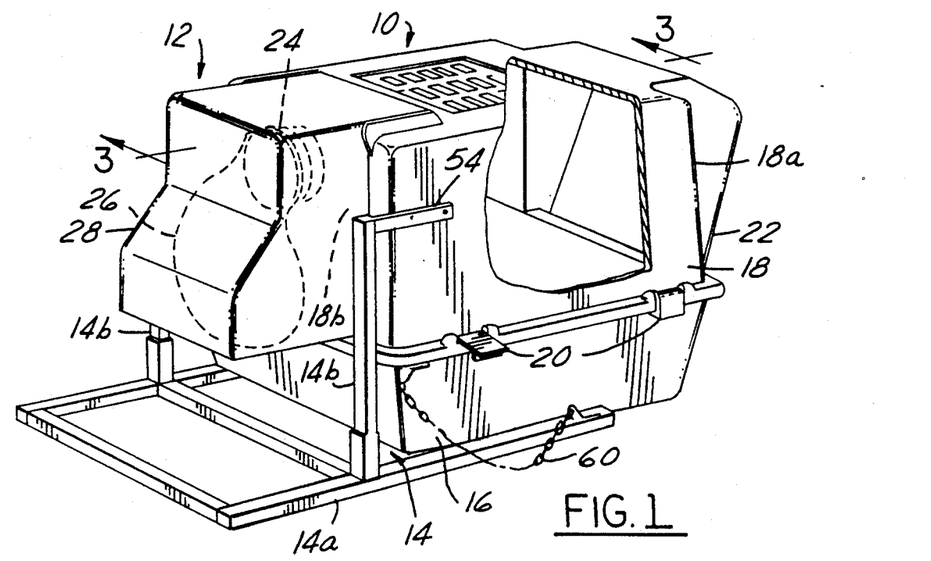
FIG. 1 is a partly sectional perspective view of the primary version of the pet privy according to the present invention.
Figure 2:
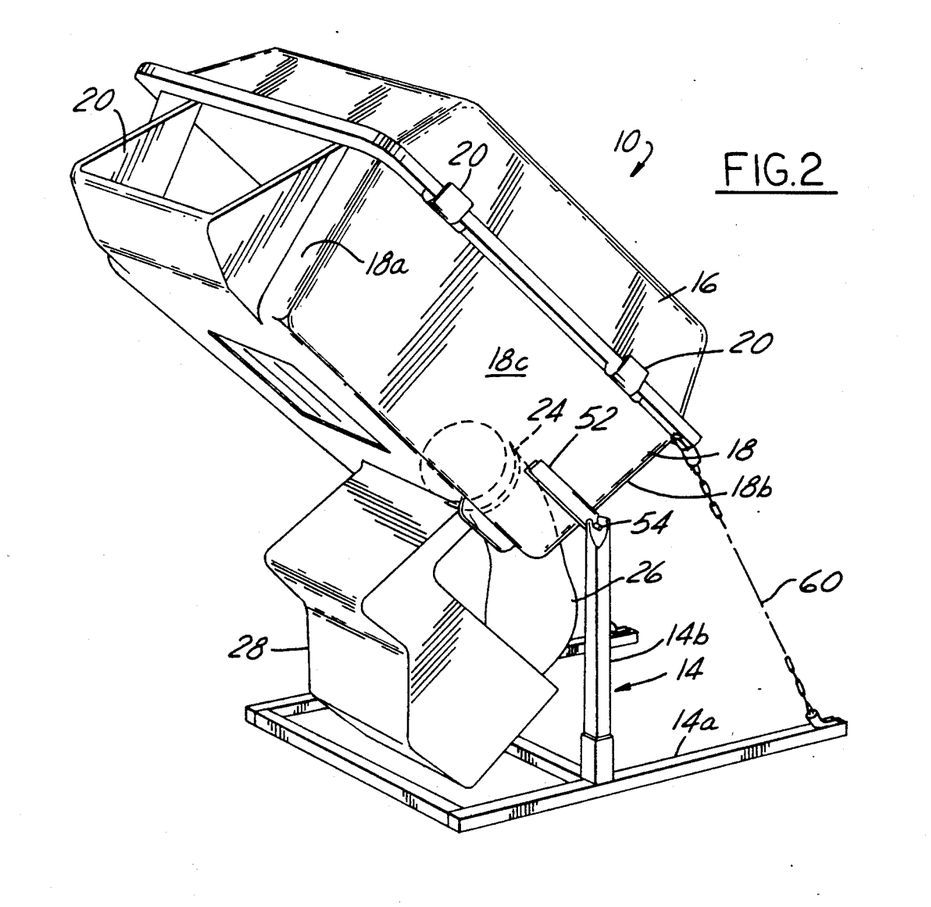
FIG. 2 is a perspective view of the primary version of the pet privy according to the present invention, shown in a fully pivoted orientation for disposing of waste.
Figures 3, 4, 5:
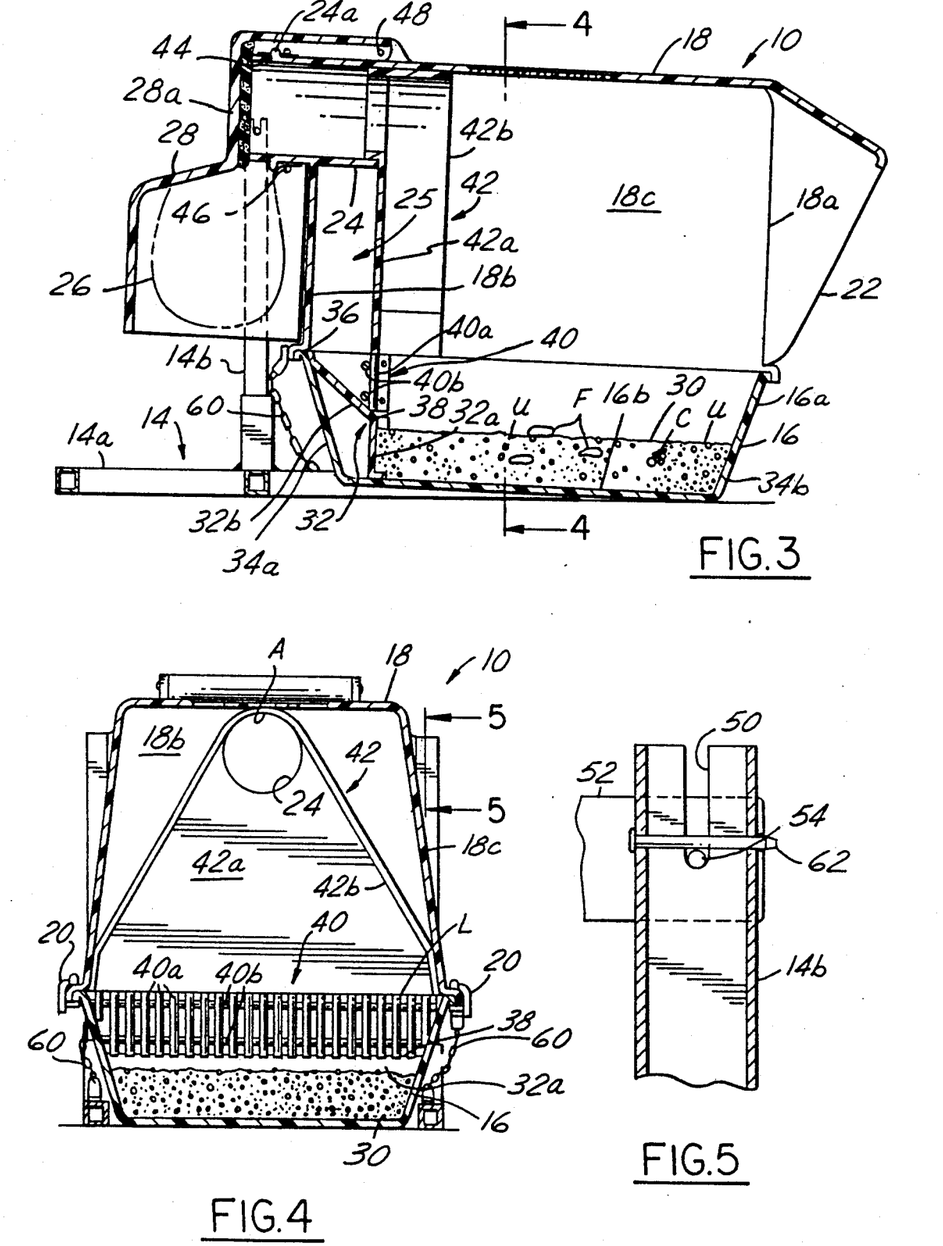
FIG. 3 is a sectional side view of the primary version of the pet privy, seen along lines 3—3 in FIG. 1.
FIG. 4 is a sectional end view of the primary version of the pet privy, seen along lines 4—4 in FIG. 3.
FIG. 5 is a detail partly sectional side view of the pivot structure of the primary version of the pet privy, seen along lines 5—5 in FIG. 4.

Referring firstly to the primary version of the pet privy 10 according to the present invention, FIG. 1 shows generally the two major components of the pet privy 10: a litter box component 12 and a support frame 14. As can be discerned from FIG. 1, the litter box component is constructed of a tray 16 and a hood 18 which lies above the tray and is connected therewith via a plurality selectively releasable clips 20 so that a user may from time to time gain direct access to the tray be removing the hood therefrom. The hood 18 includes a frontwall 18a having provided therein a pet access port 22. The hood 18 further includes a rearwall 18b having provided therethrough a discharge chute 24. Connected to the discharge chute is a disposal bag 26, and pivotally connected to the hood is a rear cover 28 for cosmetically concealing the disposal bag and for pinching closed the disposal bag when the tray is operationally oriented in substantially the horizontal plane so as to prevent odors from escaping the disposal bag and entering the hood 18. The support frame 14 includes a base 14a to which is connected a pair of legs 14b. The hood 18 includes sidewalls 18c (inclusive of the top) which are pivotally connected, adjacent the rearwall 18b, to respective legs 14b. FIG. 2 shows how pivotal movement is effected utilizing the aforesaid structural components from the operational orientation shown in FIG. 1 to the disposal orientation shown in FIG. 2. With reference now being had to FIGS. 3 through 5, a more detailed description of the structural aspects of the present invention will be elaborated.

The tray 16 is impermeable and structured to retain granular absorbent litter material 30 such as that sold under the tradename "Kitty Litter", with a surface area and depth appropriate for the class of pet intended to use the pet privy 10, such as a house cat. The preferred granular absorbent litter material 30 is of the kind known as "clumping litter" which is of a fine or large grain and has the characteristic of forming well defined clumps of material when wetted; these clumps tend to be more easily evacuated according to the operation of the present invention, as elucidated hereinbelow. A rear interior tray wall 32 is provided which is recessed a short distance from the rear end 34a of the tray 16. (Alternatively, the rear interior tray wall 32 may identically serve as the tray wall 16a at the rear end 34a of the tray). A lower portion 32a of the rear interior tray wall 32 extends perpendicularly from the bottom 16b of the tray 16 to a top 38 located at less than the full depth of the tray, and an upper portion 32b of the interior rear tray wall angling from the top 38 to the rear rim 36 of the tray. Both the upper and lower portions 32a, 32b, of the rear interior tray wall 32 are sealably connected with the tray walls 16a and the rear interior tray wall is itself impermeable to the granular absorbent litter material 30.

At the top 38 of the lower portion 32a of th rear interior tray wall 32 is located a filter grid 40 which is selectively permeable to the absorbent material 30, in that the filter grid permits passage therethrough of uncoagulated granular absorbent litter material U, but prevents passage therethrough of feces F and coagulated granular absorbent litter material C. In this regard, the filter grid 40 is preferred to be composed of a plurality of elongate members 40a connected together by one or more cross members 40b, which in turn are connected to the tray walls 16a. (Alternatively, other filter grid structures may be substituted, such as a screen.) The elongate members 40a are preferred to be formed of small circular cross-section wires or tubes, such as for example about one-eighth inch in diameter. Adjacent elongate members 40a are separated a predetermined distance which permits uncoagulated granular absorbent litter material U to pass therebetween, but does not permit ordinarily encountered faces F and coagulated granular absorbent litter material C to pass therebetween. By way of example, given a tray 16 having a depth of 6 inches, the lower portion 32a of the rear interior wall 32 would be vertically oriented about 3 inches in height, the filter grid would extend another 3 inches in height, and separation between adjacent one-eighth inch diameter elongate members would be about one-quarter to one-half inch. Each of the elongate members 40a is oriented perpendicularly with respect to the tray bottom 16b, and the elongated members are located forwardly with respect to the rear end 34a of the tray, while the cross members 40b are located rearwardly of the elongate members 40a so that the elongate members will be the sole portion of the filter grid 40 that slidably contacts the coagulated absorbent granular litter material C and feces F during filtration, as will become clear momentarily.

Figure 6:
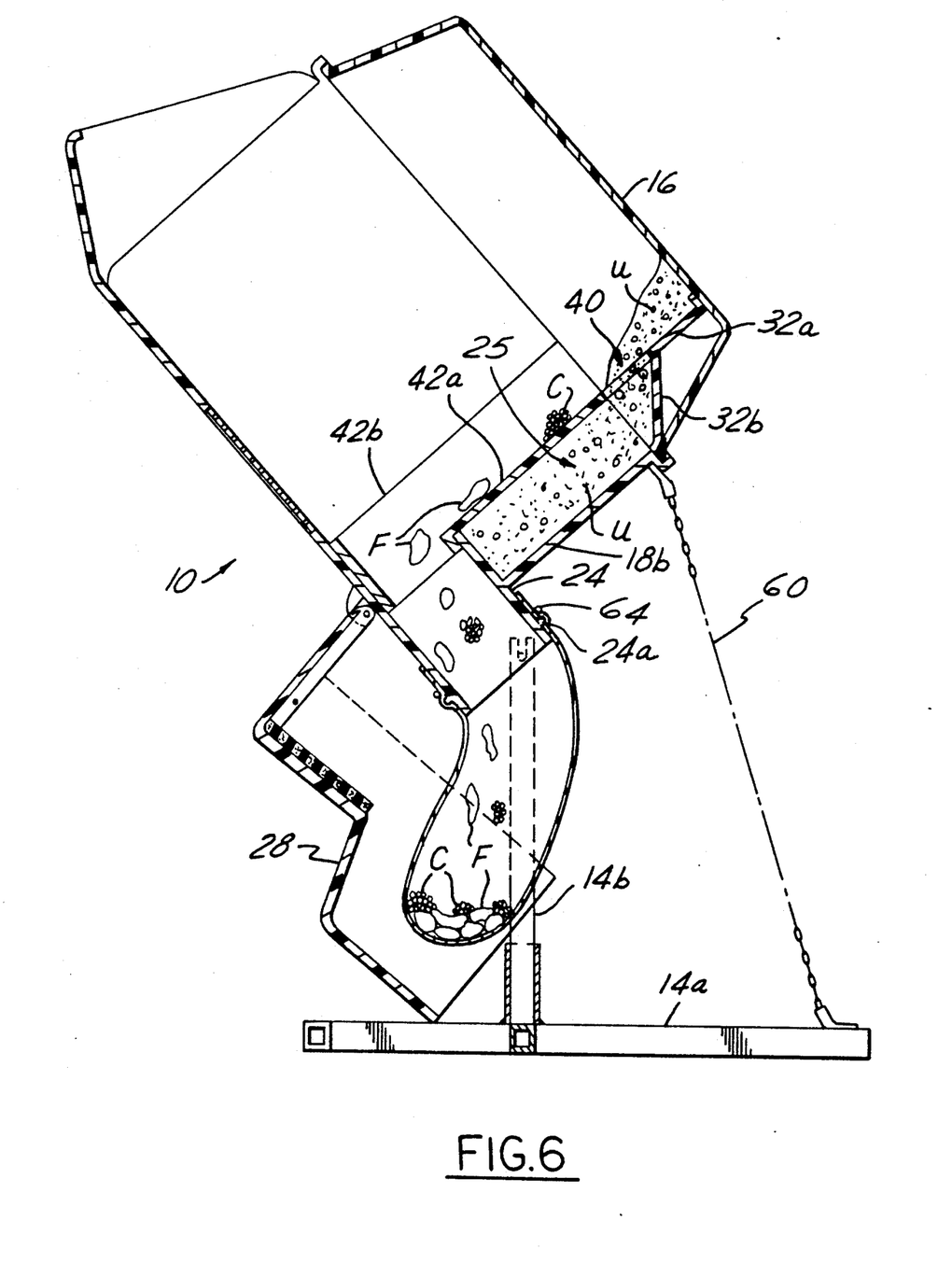

The hood 18 in its preferred configuration extends fully across the tray and is shaped to provide an enclosure for the tray 16 which is physiologically and psychologically acceptable to the pet. In this regard, the pet access port 22 is of sufficient size for the average pet of the intended class to pass therethrough without hesitation. Interior to the hood 18, and spaced a short distance from the rearwall 18b thereof, is a discharge funnel 42 composed of a floor 42a and peripheral walls 42b. The floor 42a is aligned with the elongate members 40a when the hood 18 is in place over the tray 16, as shown in FIGS. 3 and 6. The floor 42a has a generally triangular shape determined by the width of the filter grid 40 at its lower end L and by the diameter of the discharge chute 24 at the apex A. The floor 42a and peripheral walls 42b are impermeable to the feces F and the coagulated granular absorbent litter material C, and the discharge chute 24 opens into the floor 42a at the apex A. A retention chamber 25 is formed in the space between the floor 42a, the rearwall 18b and the upper portion 32a of the rear interior wall 32. The retention chamber 25 is used to temporarily hold uncoagulated granular absorbent material during servicing of the granular absorbent litter material, as will become clear from the description hereinbelow.

The discharge chute 24 extends rearwardly outside the rearwall 18b of the hood 18, and terminates in a discharge port 44. The disposal bag 26, of any conventional construction, such as plastic film and (odor retaining) paper bags, is removably secured with respect to the discharge chute 24 by operation of a retainer 46, such as an elastic band, spring or twist tie. In this regard, an annular nib 24a is provided on the discharge chute 24 near the discharge port thereof which interacts abutably with the retainer 46 so as to hold the disposal bag 24 from sliding off the discharge chute. The retainer 46 can be in the form. As indicated hereinabove, the rear cover 28 is connected to the hood 18 via a hinge 48. The rear cover 28 includes a shoulder portion 28a which is structured to press against the discharge port 44 so as to pinch the disposal bag 26 therebetween and thereby sealably close it.

The support frame 14 is composed of a base 14a which is structured to provide leverage against tipping of the base during and after pivoting of the litter box component 12. The support frame 12 includes two legs 14b which are preferably removably connected to the base 14a. The top of the legs 14b are provided with a slot 50. Each of the sidewalls 18c of the hood 18 are provided with a pivot bracket 52 having at a rearward end thereof a pivot pin 54. When the hood 18 (and the connected tray 16 which collectively form the litter box component 12) is mated to the support frame 14, each pivot pin 54 is placed into a respective slot 50 of the legs 14b. This is a preferred pivot hinge structure, as it permits easy disassembly. Preferably, a retention pin 62 is releasably inserted through holes provided in the legs 14b adjacent the pivot pin 54 so as to retain the pivot pin seated in the slot 50 during pivoting movement of the litter box component 12 with respect to the support frame 14, as shown in FIG. 5.

With regard to pivoting, the litter box component rests normally in the operational orientation with the front end 34b of the tray located lower than the rear end 34a of the tray and with the tray bottom 16b abutting the floor at the front end of the tray, while the litter box component is restrained from pivoting no more than the disposal orientation by operation of a flexible tether 60 connected between the support frame and the litter box component.

With reference being had now to the Drawing, and particularly to FIG. 6 thereof, operation of the pet privy 10 will be detailed.

After a certain amount of usage of the pet privy 10 by the one or more pets for which it is intended to be used, the granular absorbent litter material will require servicing to remove feces F and coagulated granular absorbent litter material C from the uncoagulated granular absorbent litter material U. This is very easily, quickly and conveniently concluded by the user grabbing the hood at the pet access port and thereupon pivoting the litter box component on the support frame until the disposal orientation shown in FIG. 6 is attained. During this pivoting, the granular absorbent litter material will shift rearwardly onto the filter grid, whereupon only uncoagulated granular absorbent litter material will pass through into the retention chamber. Feces and coagulated granular absorbent litter material (collectively referred to as "waste") will slide along the elongate members (which facilitate this movement because they are oriented in the same direction and the direction of movement of the waste), and continue to slide along the floor of the funnel and into the discharge chute, to end up deposited in the disposal bag. During pivoting, the rear cover pivots out of the way, thereby freeing the bag for being filled by the waste. Upon the conclusion of this pivoting movement; the litter box component is pivoted back into the operational orientation shown in FIG. 1. The uncoagulated granular absorbent litter material exits the retention chamber by passing back again through the filter grid, the retention chamber being emptied due to gravitationally urged sliding along the angled upper portion of the rear interior tray wall. Further, the uncoagulated granular absorbent litter material tends to slide forwardly in the tray since the front end of the tray is lower than the rear end of the tray, thus more or less evening the final distribution of the uncoagulated granular absorbent litter material in the tray. In the operational orientation, the rear cover will have pivoted back into place adjacent the rearwall of the hood thereby pinching closed the disposal bag so as to prevent odor from exiting therefrom into the hood. Once the disposal bag gets full (after one, two, three or more servicing pivots), it is replaced by releasing it from the retainer, and a new bag is installed on the discharge chute and held thereon by the retainer.

It is to be noted that as a practical matter some granular absorbent litter material may become nominally wetted and thereby become coagulated so as to form a minor sized clump. These minor sized clumps are of little concern and are treated herein as being part of the uncoagulated granular absorbent litter material U for purposes of passage through the filter grid. The reason for this is that the filter grid should have a sufficiently open mesh size (distance between adjacent elongate members) so as to filter in the manner aforesaid, but not be unduly restrictive so as to be subject to clogging or subject to taking an inordinate amount of time to process the filtering; ergo, minor sized clumps can be allowed to pass therethrough to a lesser or greater degree at the design option of the manufacturer.

While the preferred structure of the primary version of the pet privy 10 has been set forth hereinabove, some change or modification thereof is possible. For instance, as will be discussed hereinbelow with respect to the secondary version of the pet privy 10', while a full hood is depicted in the Drawing as being an attribute of the preferred embodiment of the present invention, the hood may be limited in size and scope. In the case of maximum limitation, the hood becomes merely a "rearwall component" (see the analogous depiction in FIGS. 7 and 8), wherein the funnel and discharge chute components would be connected with the rearwall component in the manner as described and shown with respect to the preferred configuration of the hood, the tray would also be connected with the rearwall component at the rear end thereof, and the rearwall component would be pivotally connected with the support frame as generally disclosed and shown with respect to the preferred configuration of the hood. Further, while a disposal bag is preferred to be included with the pet privy 10, it may be dispensed with (as the user may simply tilt the litter box component 12 so that the waste directly enters some refuse container.

Figure 7:
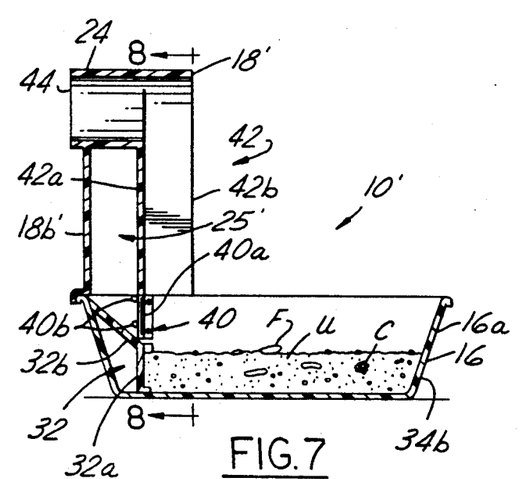
FIG. 7 is a partly sectional side view of a secondary version of the pet privy according to the present invention, structured for being manually carried to a dumping site.
Figure 8:
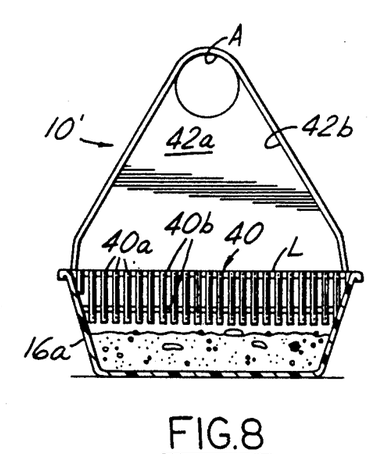
FIG. 8 is a partly sectional end view of the secondary version of the pet privy, seen along lines 8—8 of FIG. 7.
Figure 9:
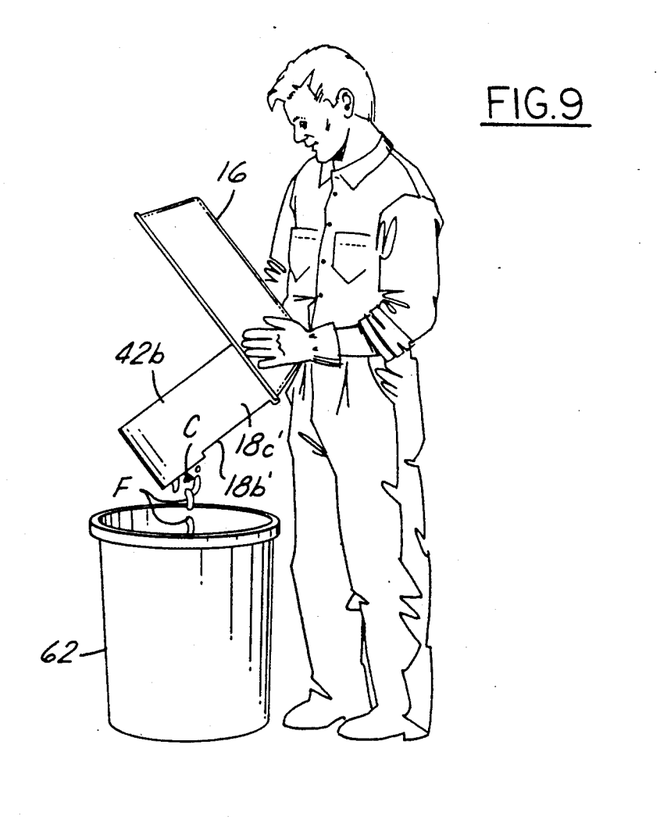
FIG. 9 is a perspective view of the secondary version of the pet privy, shown in operation during waste disposal.

Turing now to the second version of the privy 10' according to the present invention, parts described hereinabove with respect to the primary version of the pet privy 10 are structured and function essentially the same, except that the hood is reduced now to a rearwall component 18', and the support frame, disposal bag and rear cover are eliminated. FIGS. 7, 8 and 9 depict the parts structured and functioning as described hereinabove with respect to the pet privy 10 by use of the same numeral designations, and it is therefore unnecessary to discuss these components further; modified parts are designated with a prime. In the pet privy 10', the rearwall component 18' is composed of the hood of the pet privy 10 now modified into a compact configuration, having only a rearwall 18b' and shortened sidewalls 18c'. It is preferred for aesthetic reasons to construct the sidewalls 18c' from the same component from which is formed the peripheral walls 42b, as shown in FIG. 9, so as to provide a singular wall serving in part as the sidewalls 18c' and in part as the peripheral walls 42b. The funnel 42 and discharge chute 24 connect with the rearwall component 18', and the tray 16 is also connected with the rearwall component at the rear end thereof. The retention chamber 25' is determined by the rearwall 18b' (which is now shown in FIGS. 8 and 9 as having essentially the same area as the floor 42a), the upper portion 32b of the interior rear tray wall 32 and the floor 42a.

In operation, after a period of time the absorbent granular litter material will need servicing to remove feces F and coagulated granular absorbent litter material C from the uncoagulated granular absorbent litter material U. This is very easily, quickly and conveniently concluded by the user grabbing the tray and or the sidewall, lifting the pet privy 10' and carrying it to a disposal location having a trash receptacle 62. Thereupon, with the discharge port located over the trash receptacle, the user tilts the per privy 10' until the disposal orientation shown in FIG. 9 is attained. During this tilting, the granular absorbent litter material will shift rearwardly onto the filter grid, whereupon only uncoagulated granular absorbent litter material will pass through into the retention chamber. Feces and coagulated granular absorbent litter material (collectively referred to as "waste") will slide along the elongate members (which facilitate this movement because they are oriented in the same direction and the direction of movement of the waste), and continue to slide along the floor of the funnel and into the discharge chute, to end up deposited in the disposal bag. During pivoting, the rear cover pivots out of the way, thereby freeing the bag for being filled by the waste. Upon the conclusion of this tilting movement, the litter box component is pivoted back into the operational orientation shown in FIG. 7. The uncoagulated granular absorbent litter material exits the retention chamber by passing back again through the filter grid, the retention chamber being emptied due to gravitationally urged sliding along the angled upper portion of the rear interior tray wall. Further, the uncoagulated granular absorbent litter material tends to slide forwardly in the tray since the front end of the tray is lower than the rear end of the tray, thus more or less evening the final distribution of the uncoagulated granular absorbent litter material in the tray.

As a variation of the secondary version of the pet privy 10', the hood 18 may be unmodified from that disclosed with respect to the primary version of the pet privy 10.

To those skilled in the art to which this invention appertains, the above described preferred embodiment may be subject to change or modification. Such change or modification can be carried out without departing from the scope of the invention, which is intended to be limited only by the scope of the appended claims.

What is claimed is:

1. A pet privy utilizing a granular absorbent litter material for accepting pet excrement, the granular absorbent litter material being uncoagulated when dry, the coagulated granular absorbent litter material coagulating when wet, the coagulated granular absorbent material and pet feces of the pet excrement constituting waste, said pet privy comprising:

a support frame; and a litter box component pivotally connected with said support frame component, said litter box component being pivotable from an operational orientation which provides for usage thereof by one or more pets to a disposal orientation which provides for removing the waste therefrom, said litter box component comprising:

a hood having a rearwall, said hood being pivotally connected at said rearwall to said support frame, said hood comprising at least a rearwall component located at said rear wall, said rearwall component comprising said rearwall and a plurality of sidewalls;

a tray connected with said hood, said tray being structured for retaining a quantity of the granular absorbent litter material, said tray having a rear end and a front end;

filter grid means connected with said rear end of said tray for filtering the granular absorbent litter material when said litter box component is pivoted from said operational orientation to said disposal orientation such that the uncoagulated granular absorbent litter material is passable therethrough but the waste is not passable therethrough;

a discharge chute connected with and extending through said rearwall of said hood, said discharge chute having a discharge port;

a disposal bag releasably connected with said discharge port of said discharge chute; and funnel means connected with said hood adjacent said filter grid means and connected with said discharge chute for directing the coagulated granular absorbent material and feces into said discharge chute so as to be finally deposited as waste into said disposal bag;

wherein, pivoting of said litter box component from said operational orientation to said disposal orientation results in the granular absorbent litter material sliding toward said rear end of said tray, the uncoagulated granular absorbent litter material passing through said filter grid means and accumulating in a retention chamber defined generally by said rearwall and said plurality of sidewalls of said hood, said funnel means, said filter grid means and said rear end of said tray, the waste sliding over said filter grid means, sliding along said funnel means into said discharge chute, exiting said discharge port and depositing into said disposal bag; wherein further pivoting of said litter box component from said disposal orientation back to said operational orientation results in the uncoagulated granular absorbent litter material exiting said retention chamber by passing back through said filter grid means into said tray.

2. The pet privy of claim 1, wherein said tray has a bottom, wherein further said filter grid means comprises a plurality of elongate members each oriented substantially perpendicular with respect to said bottom of said tray, each elongate member being separated from each adjacent elongate member so as to provide said filtering of the granular absorbent litter material.

3. The pet privy of claim 2, wherein contact of said filter grid means with the granular absorbent litter material is substantially only provided by said elongate members so as to facilitate said sliding of the waste with respect to said filter grid means.

4. The pet privy of claim 3, further comprising rear cover means pivotally connected with said rearwall of said hood for pinching closed said disposal bag with respect to said discharge port of said discharge chute when said tray and rear wall means are in said operational orientation, said rear cover pivoting out of the way of said disposal bag when said tray and said rear wall component are in said disposal orientation so as to provide unobstructed entry of the waste into said disposal bag.

5. The pet privy of claim 4, wherein said plurality of sidewalls of said hood are structured so that said hood fully covers said tray, said hood further having a frontwall, said frontwall being provided with an access port for the one or more pets using said litter box component.

6. The pet privy of claim 5, wherein said hood is releasably connected with said tray.

7. The pet privy of claim 5, wherein said funnel means comprises:

a floor member impermeable to the granular absorbent litter material, said floor member having a substantially triangular shape defined by a bottom edge and an apex, said bottom edge being aligned with said elongate members of said filter grid means, said floor member being oriented substantially perpendicular with respect to said bottom of said tray, said discharge chute being connected with said floor member and opening thereinto at said apex thereof; and peripheral walls which are impermeable to said granular absorbent litter material, said peripheral walls being connected with all peripheral edges of said floor member except along said bottom edge, said peripheral walls being oriented substantially perpendicular with respect to said floor member.

8. The pet privy of claim 7, wherein said tray has sidewalls having a rim, further comprising a rear interior wall sealably connected with said bottom and said sidewalls of said tray at said rear end thereof, said rear interior wall being impermeable to said granular absorbent litter material, said rear interior wall comprising:

a lower portion having an upper end and a lower end, said lower portion being oriented substantially perpendicular with respect to said bottom of said tray and aligned with said elongated members of said filter grid means, said lower end of said lower portion being sealably adjacent said bottom and said sidewalls of said tray, said upper end of said lower portion being adjacent said elongate members of said filter grid means; and an upper portion oriented at an angle with respect to said lower portion such that a first end of said upper portion is sealably adjacent said rim of said sidewalls of said tray at said rear end thereof, and such that an opposite second end of said upper portion is sealably adjacent said upper end of said lower portion.

9. The pet privy of claim 8, wherein said support frame comprise:

a base for being located on a surface, said base being dimensioned so as to prevent tipping when said tray and said rear wall component are anywhere between and including said disposal orientation and said operational orientation; and a pair of legs connected with said base, said pair of legs being pivotally connected with said hood proximate said rearwall thereof.

10. The pet privy of claim 9, wherein said hood further comprises pivot pin means located on either side thereof at said rearwall for pivotably engaging with said pair of legs, one leg of said pair of legs engaging with a respective one of said pivot pin means.

11. The pet privy of claim 10, wherein said pivot pin means is located with respect to said hood so as to minimize torque necessary to effect pivotal movement of said litter box component with respect to said support frame.

12. The pet privy of claim 11, further comprising retainer means for releasably retaining said disposable bag on said discharge chute.

13. The pet privy of claim 12, further comprising maximum pivot movement means connected with said support frame for defining maximum pivotal movement of said litter box component with respect to said support frame at least one of said operational orientation and at said disposal orientation; and wherein said litter box component is connected with respect to said support frame such that said bottom of said tray at said front end thereof is positioned lower than said bottom of said tray at said rear end thereof when said litter box component is at said operational orientation so as to facilitate redistribution of uncoagulated absorbent litter material across said tray when said litter box component is pivoted from said disposal orientation to said operational orientation.

14. The pet privy of claim 4, wherein said funnel means comprises:

a floor member impermeable to the granular absorbent litter material, said floor member having a substantially triangular shape defined by a bottom edge and an apex, said bottom edge being aligned with said elongate members of said filter grid means, said floor member being oriented substantially perpendicular with respect to said bottom of said tray, said discharge chute being connected with said floor member and opening thereinto at said apex thereof; and peripheral walls which are impermeable to said granular absorbent litter material, said peripheral walls being connected with all peripheral edges of said floor member except along said bottom edge, said peripheral walls being oriented substantially perpendicular with respect to said floor member.

15. The pet privy of claim 14, wherein said tray has sidewalls having a rim, further comprising a rear interior wall sealably connected with said bottom and said sidewalls of said tray at said rear end thereof, said rear interior wall being impermeable to said granular absorbent litter material, said rear interior wall comprising:

a lower portion having an upper end and a lower end, said lower portion being oriented substantially perpendicular with respect to said bottom of said tray and aligned with said elongate members of said filter grid means, said lower end of said lower portion being sealably adjacent said bottom and said sidewalls of said tray, said upper end of said lower portion being adjacent said elongate members of said filter grid means; and an upper portion oriented at an angle with respect to said lower portion such that a first end of said upper portion is sealably adjacent said rim of said sidewalls of said tray at said rear end thereof, and such that an opposite second end of said upper portion is sealably adjacent said upper end of said lower portion.

16. The pet privy of claim 15, wherein said support frame comprises:

a base for being located on a surface, said base being dimensioned so as to prevent tipping when said tray and said rear wall component are anywhere between and including said disposal orientation and said operational orientation; and a pair of legs connected with said base, said pair of legs being pivotally connected with said hood proximate said rearwall thereof.

17. The pet privy of claim 16, wherein said hood further comprises pivot pin means located on either side thereof at said rearwall for pivotally engaging with said pair of legs, one leg of said pair of legs engaging with a respective one of said pivot pin means.

18. The pet privy of claim 17, wherein said pivot pin means is located with respect to said hood so as to minimize torque necessary to effect pivotal movement of said litter box component with respect to said support frame.

19. The pet privy of claim 18, further comprising retainer means for releasably retaining said disposable bag on said discharge chute.

20. The pet privy of claim 19, further comprising maximum pivot movement means connected with said support frame for defining maximum pivotal movement of said litter box component with respect to said support frame at least one of said operational orientation and at said disposal orientation; and wherein said litter box component is connected with respect to said support frame such that said bottom of said tray at said front end thereof is positioned lower than said bottom of said tray at said rear end thereof when said litter box component is at said operational orientation so as to facilitate redistribution of uncoagulated absorbent litter material across said tray when said litter box component is pivoted from said disposal orientation to said operational orientation.

21. A pet privy utilizing a granular absorbent litter material for accepting pet excrement, the granular absorbent litter material being uncoagulated when dry, the coagulated granular absorbent litter material coagulating when wet, the coagulated granular absorbent material and pet feces of the pet excrement constituting waste, said pet privy comprising:

a hood having a rearwall, said hood being pivotally connected at said rearwall to said support frame, said hood comprising at least a rearwall component located at said rear wall, said rearwall component comprising said rearwall and a plurality of sidewalls;

a tray connected with said hood, said tray being structured for retaining a quantity of the granular absorbent litter material, said tray having a rear end and a front end;

filter grid means connected with said rear end of said tray for filtering the granular absorbent litter material when said litter box component is pivoted from said operational orientation to said disposal orientation such that the uncoagulated granular absorbent litter material is passable therethrough but the waste is not passable therethrough;

a discharge chute connected with and extending through said rearwall of said hood, said discharge chute having a discharge port; and funnel means connected with said hood adjacent said filter grid means and connected with said discharge chute for directing the coagulated granular absorbent material and feces into said discharge chute so as to be finally deposited as waste exteriorly of said discharge chute;

wherein, a user lifts said pet privy from an operational orientation in which said tray rests upon a surface and then tilts said pet privy to a disposal orientation in which said discharge chute is at a lower location than said tray so as to thereby result in the granular absorbent litter material sliding toward said rear end of said tray, the uncoagulated granular absorbent litter material passing through said filter grid means and accumulating in a retention chamber defined generally by said rearwall and said plurality of sidewalls of said hood, said funnel means, said filter grid means and said rear end of said tray, the waste sliding over said filter grid means, sliding along said funnel means into said discharge chute, and exiting from said discharge port as waste; wherein further tilting of said litter box component from said disposal orientation to back to said operational orientation results in the uncoagulated granular absorbent litter material exiting said retention chamber by passing back through said filter grid means into said tray.

22. The pet privy of claim 21, wherein said tray has a bottom, wherein further said filter grid means comprises a plurality of elongate members each oriented substantially perpendicular with respect to said bottom of said tray, each elongate member being separated from each adjacent elongate member so as to provide said filtering of the granular absorbent litter material.

23. The pet privy of claim 22, wherein contact of said filter grid means with the granular absorbent litter material is substantially only provided by said elongate members so as to facilitate said sliding of the waste with respect to said filter grid means.

24. The pet privy of claim 23, wherein said plurality of sidewalls of said hood are structured so that said hood fully covers said tray, said hood further having a frontwall, said frontwall being provided with an access port for the one or more pets using said litter box component.

25. The pet privy of claim 24, wherein said hood is releasably connected with said tray.

26. The pet privy of claim 24, wherein said funnel means comprises:

a floor member impermeable to the granular absorbent litter material, said floor member having a substantially triangular shape defined by a bottom edge and an apex, said bottom edge being aligned with said elongate members of said filter grid means, said floor member being oriented substantially perpendicular with respect to said bottom of said tray, said discharge chute being connected with said floor member and opening thereinto at said apex thereof; and peripheral walls which are impermeable to said granular absorbent litter material, said peripheral walls being connected with all peripheral edges of said floor member except along said bottom edge, said peripheral walls being orient substantially perpendicular with respect to said floor member.

27. The pet privy of claim 26, wherein said tray has sidewalls having a rim, further comprising a rear interior wall sealably connected with said bottom and said sidewalls of said tray at said rear end thereof, said rear interior wall being impermeable to said granular absorbent litter material, said rear interior wall comprising:

a lower portion having an upper end and a lower end, said lower portion being oriented substantially perpendicular with respect to said bottom of said tray and aligned with said elongate members of said filter grid means, said lower end of said lower portion being sealably adjacent said bottom and said sidewalls of said tray, said upper end of said lower portion being adjacent said elongate members of said filter grid means; and an upper portion oriented at an angle with respect to said lower portion such that a first end of said upper portion is sealably adjacent said rim of said sidewalls of said tray at said rear end thereof, and such that an opposite second end of said upper portion is sealably adjacent said upper end of said lower portion.

28. The pet privy of claim 23, wherein said funnel means comprises:

a floor member impermeable to the granular absorbent litter material, said floor member having a substantially triangular shape defined by a bottom edge and an apex, said bottom edge being aligned with said elongate members of said filter grid means, said floor member being oriented substantially perpendicular with respect to said bottom of said tray, said discharge chute being connected with said floor member and opening thereinto at said apex thereof; and peripheral walls which are impermeable to said granular absorbent litter material, said peripheral walls being connected with all peripheral edges of said floor member except along said bottom edge, said peripheral walls being oriented substantially perpendicular with respect to said floor member.

29. The pet privy of claim 28, wherein said tray has sidewalls having a rim, further comprising a rear interior wall sealably connected with said bottom and said sidewalls of said tray at said rear end thereof, said rear interior wall being impermeable to said granular absorbent litter material, said rear interior wall comprising:

a lower portion having an upper end and a lower end, said lower portion being oriented substantially perpendicular with respect to said bottom of said tray and aligned with said elongate members of said filter grid means, said lower end of said lower portion being sealably adjacent said bottom and said sidewalls of said tray, said upper end of said lower portion being adjacent said elongate members of said filter grid means; and an upper portion oriented at an angle with respect to said lower portion such that a first end of said upper portion is sealably adjacent said rim of said sidewalls of said tray at said rear end thereof, and such that an opposite second end of said upper portion is sealably adjacent said upper end of said lower portion.

* * * * *